March 14, 1950 — O. R. WINKLER — 2,500,889
PORTABLE LIVESTOCK FEEDER
Filed June 17, 1946 — 2 Sheets-Sheet 1

ORVILLE R. WINKLER
INVENTOR.

BY Cecil L. Wood
ATTORNEY

March 14, 1950      O. R. WINKLER      2,500,889
PORTABLE LIVESTOCK FEEDER
Filed June 17, 1946      2 Sheets-Sheet 2
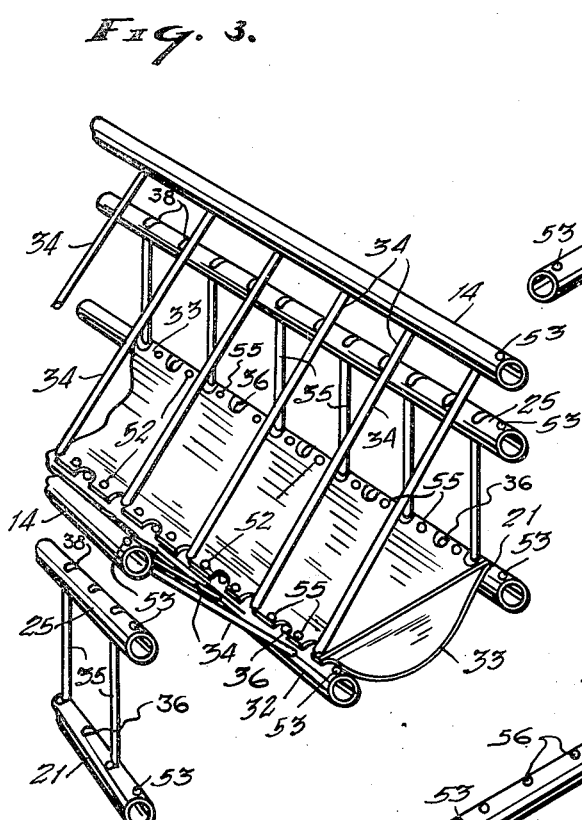
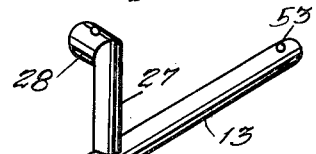
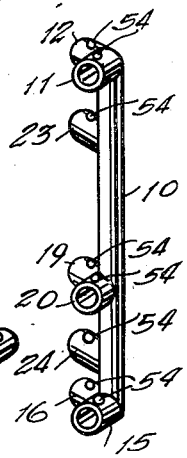
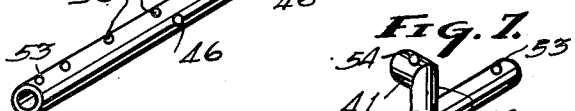
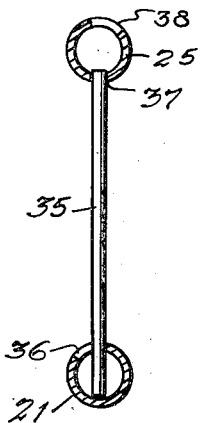
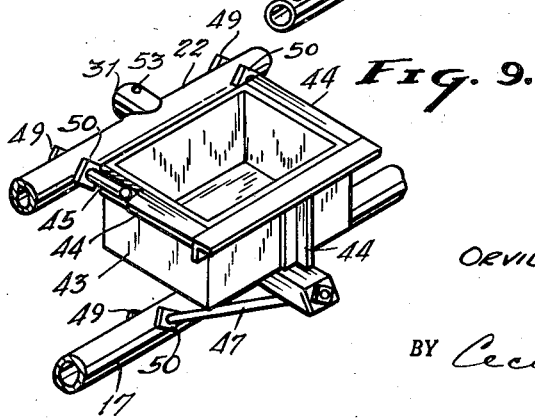
ORVILLE R. WINKLER
INVENTOR.
BY *Cecil L. Wood*
ATTORNEY Patented Mar. 14, 1950

2,500,889

UNITED STATES PATENT OFFICE 2,500,889

PORTABLE LIVESTOCK FEEDER

Orville R. Winkler, Fort Worth, Tex.

Application June 17, 1946, Serial No. 677,266

1 Claim. (Cl. 119—58)

This invention relates to collapsible feeding devices for livestock, or the like, and it has particular reference to apparatus especially designed for feeding range cattle and horses, as well as small animals, such as sheep, goats, hogs, and the like, and its principal object resides in the provision of an economical portable structure comprising an arrangement of parts which are detachably assembled and capable of modified association to accommodate livestock of various sizes and ages whereby the younger and smaller animals can be properly nourished to the exclusion of larger and older animals.

Another object of the invention resides in the provision of a portable structure embodying features which render the device capable of being disassembled and conveniently transported as by shipping or moving from one place to another and about the farm or ranch premises with a minimum of effort.

Broadly, the invention seeks to comprehend the provision of a livestock feed dispensing device constructed economically of tubular materials, such as pipe, or angle iron or the like, and assembled with pins or bolts so that the structure can be knocked down and removed, with a minimum of difficulty, to different locations.

While the foregoing objects are paramount, other and lesser objects will become manifest as the description proceeds, taken in connection with the appended drawings wherein.

Figure 3 fragmentarily illustrates, in perspective, the inclined arrangement of stanchions forming the hay rack and illustrating one of the troughs and vertical stanchions.

Figure 4 is a perspective illustration of one of the upper transverse frame members.

Figure 5 illustrates in perspective, one of the frame supporting members having integral sockets thereon.

Figure 6 is a perspective illustration of one of the intermediate transverse end members having an integral socket intermediate its ends.

Figure 7 illustrates in perspective, one of the lowermost transverse end members having a pair of spaced angular sockets integral thereon.

Figure 8 is a vertical section through one of the stanchion assemblies illustrating the detachable arrangement of vertical removable stanchions, and Figure 9 is a perspective view showing one of the mineral boxes and the manner in which these elements are attached to the frame which is shown fragmentarily.

Figure 1:
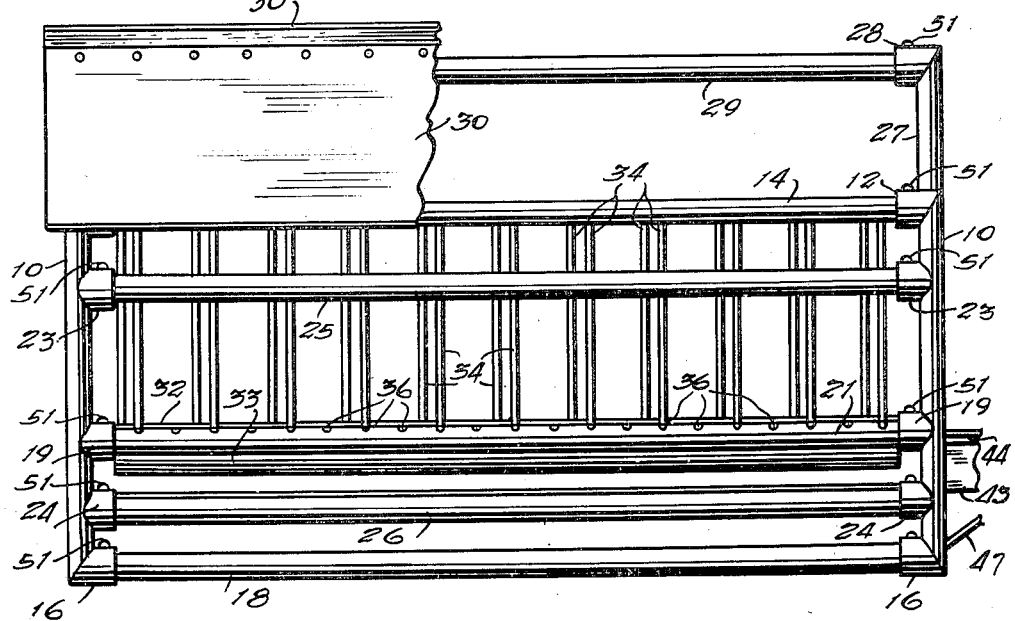
Figure 1 is a side elevational view of the invention showing the roof or covering partially cut away.
Figure 2:
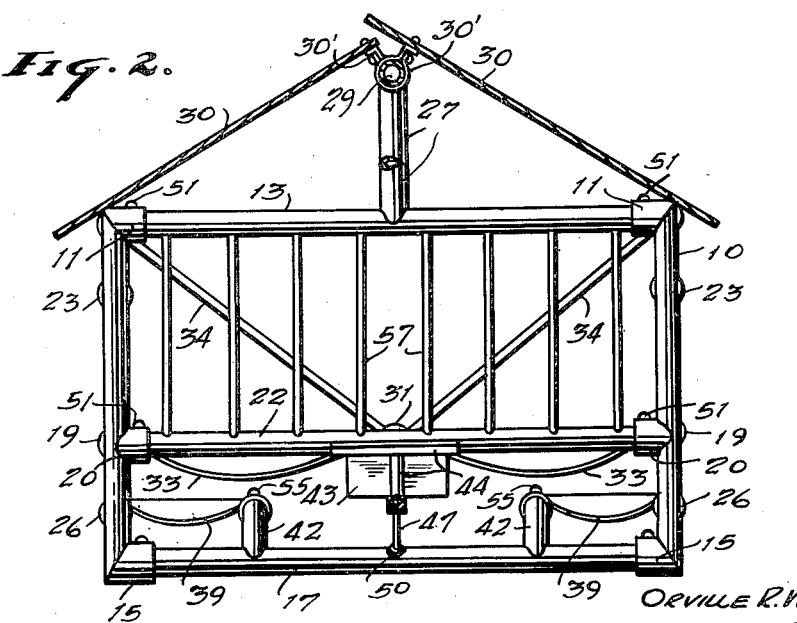
Figure 2 illustrates an end view of the invention showing the arrangement of feeding troughs at different elevations, the hinged cover, and one of the detachable mineral troughs.

The invention is preferably constructed of tubing or pipe of substantial diameter and consists of corner standards 10 which are formed with integral sockets extending laterally therefrom and at ninety degree angles with respect to each other, as illustrated in Figures 1, 2 and 5. The dual arrangements of right angular sockets 11 and 12 at the upper ends of the standards 10 receive the transverse and longitudinal frame members 13 and 14, respectively, the former being illustrated in detail in Figure 4. The dual arrangement of sockets 15 and 16, at the bottom of the standards 10, provide receptacles for the ends of the transverse end members 17 illustrated in detail in Figure 7, and the longitudinal members 18.

Spaced above the lower end of each of the standards 10 is a dual arrangement of sockets 19 and 20, which are directed at ninety degree angles to the standard 10, providing receptacles for the ends of longitudinal frame members 21 and the transverse end members 22, the latter being shown in detail in Figure 6. Integral sockets 23 and 24, parallel to the sockets 12 and 16, are arranged on one side of each of the standards 10, and are spaced from the ends thereof to receive the ends of longitudinal frame members 25 and 26 which will be presently described.

The transverse members 13, shown in Figure 4, are arranged across the upper ends of the frame between the standards 10, in the manner shown in Figure 2, and each is provided with an integral riser 27 having a socket 28 extending at right angles thereto. The sockets 28 provide receptacles for the ends of a ridge-pole member 29 which, in cooperation with the parallel members 14, support the roof or cover 30 for the entire structure and which is shown in Figures 1 and 2. The roof or cover 30 is preferably in two inclined sections, each connected by hinge members 30' to the ridge-pole 29, as shown particularly in Figure 2. The cover 30 is optional but is desirable in protecting the contents from the elements.

The transverse end members 22, shown in detail in Figure 6, are paired and opposingly arranged and each has an integral socket 31 which is directed inwardly of the structure. The sockets 31 support a longitudinal member 32 intermediate the sides of the feeder and in the same plane with the longitudinal side members 21. A feed trough 33 is arranged on each side of the longitudinal member 32 and is supported between this member and the members 21, as shown in Figures 2 and 6, in which grain or ground feeds are placed for livestock. A plurality of equidistantly spaced bars 34 are arranged between the longitudinal members 14 and 32 and are inclined downwardly from each of the longitudinal members 14 to the central member 32 forming a V-shaped rack for hay, or the like, above the troughs 33. It is desirable that the bars 34 be capable of insertion at each end into apertures spaced along the members 14 and 32, rather than be welded thereto, in order to provide for dismantling the assembly and storing or packing the same.

It is desirable to afford a means for the feeding of small animals, such as calves, to the exclusion of the larger adult animals and this may be accomplished by the detachable and adjustable arrangement of a plurality of spaced stanchions 35 disposed vertically along and between the frame members 21 and 25 and shown in detail in Figure 8. The longitudinal frame members 21, which also support the outer edges of the troughs 33, are provided with spaced slots 36 arranged so that their greater dimension is circumferentially of the members 21, as in Figure 8, and receive the lowermost ends of the stanchions 35 while the uppermost ends of these members extend into apertures 37 in the lower sides of the members 25. Similar slots 38 are arranged along the upper sides of the members 25 to permit the stanchions 35 to extend through these members while being installed or removed, the weight of the stanchions 35 retaining these members in position while the device is in use. Obviously, this arrangement may be used as a milking stanchion, as well as a feeding device.

The slots 36 and 38 and apertures 37 are spaced so that the stanchions 35 may be varied as to spacing to accommodate growing animals, and when it is desirable to feed only adult animals the stanchions 35 may be removed altogether, as in the illustration of the invention shown in Figure 1. Obviously, a portion of the stanchions 35 may be employed when feeding small animals with the larger ones, or one side may be prepared and reserved for the growing calves, leaving the opposite side for adult animals.

Provision is made for feeding such small animals as hogs, sheep, goats, and the like by arranging a trough 39 on each side of the assembly below the troughs 33 which are supported along their outer edges on longitudinally arranged members 26 while their inner edges are secured to parallel longitudinal members 40 whose ends are detachably secured in sockets 41 integral with and extending at right angles from the upper ends of paired risers 42 on the lowermost transverse end members 17, shown in Figure 7, the risers 42 being spaced from the ends of the members 17. The troughs 39 can be omitted from the structure without impairing the same for use in feeding larger animals.

A box or trough 43 is detachably secured to one or both ends of the feeder, as shown in detail in Figure 9, and is capable of containing minerals, such as salt, or the like, or providing a watering trough if desired. The box 43 is preferably of wood and is adequately reenforced with irons 44 to which are welded threaded mounting rods 45 which extend through apertures 46 in the end members 22 of the frame structure. The box 43 may be of any suitable design and dimension, extending from side to side of the invention across either or both ends, or it may be of smaller dimension, as illustrated in Figure 9, and is supported beneath by a brace rod 47 extending downwardly from the irons 44 and through an aperture 48 in each of the lowermost end members 17, previously described. Nuts 49 and 50 are threaded on the rods 45 and 47 on each side of the supporting members 17 and 22 to provide suitable means detachably securing the containers.

The invention is capable of complete collapsibility or assembly by providing for securing the frame members in the several sockets with pins or bolts 51, and attaching the troughs 33 and 39 by bolts 52, in the manner shown in Figure 3. The ends of all of the frame members have apertures 53 therein which correspond to the apertures 54 in each of the sockets into which they are inserted.

Each of the end members 13 and 22 have spaced apertures 56 arranged along their lower and upper sides, respectively, which receive the ends of stays 57 which enclose the ends of the frame structure, as shown in Figure 2.

Manifestly, the structure herein shown and described is capable of certain changes and modifications by persons skilled in the art, without departing from the spirit and intent of the invention or the scope of the appended claim.

What is claimed is:

In a feeding device for livestock, in combination, a collapsible frame structure comprising a plurality of tubular upright standards, each forming a corner support for said frame and each having a plurality of lateral sockets spaced longitudinally thereof, horizontal tubular members arranged between said standards along each side and across each end of said frame and having their ends detachably secured in said sockets, a rack formed centrally of said frame and longitudinally thereof comprising a tubular horizontal member detachably supported at each end in the end structures of said frame, a series of vertical tubular bars spaced along said centrally arranged tubular member and extending outwardly and upwardly from each side thereof and into one of said first named horizontal frame members, the said bars having their ends arranged in apertures spaced along said horizontal tubular members, and a cover hingedly arranged on said frame.

ORVILLE R. WINKLER.

REFERENCES CITED

The following references are of record in the file of this patent:

UNITED STATES PATENTS

| Number | Name | Date |
| --- | --- | --- |
| Re. 22,657 | Babson et al. | Aug. 7, 1945 |
| 42,927 | Close | May 31, 1864 |
| 243,627 | Rutz | June 28, 1881 |
| 375,329 | Barnsback et al. | Dec. 27, 1887 |
| 1,286,676 | Little | Dec. 3, 1918 |
| 1,473,019 | Dawley | Nov. 6, 1923 |